2 Sheets—Sheet 1.
L. S. ROBBINS.
APPARATUS FOR MANUFACTURING PAINT OIL.
No. 8,491. Patented Nov. 4, 1851.
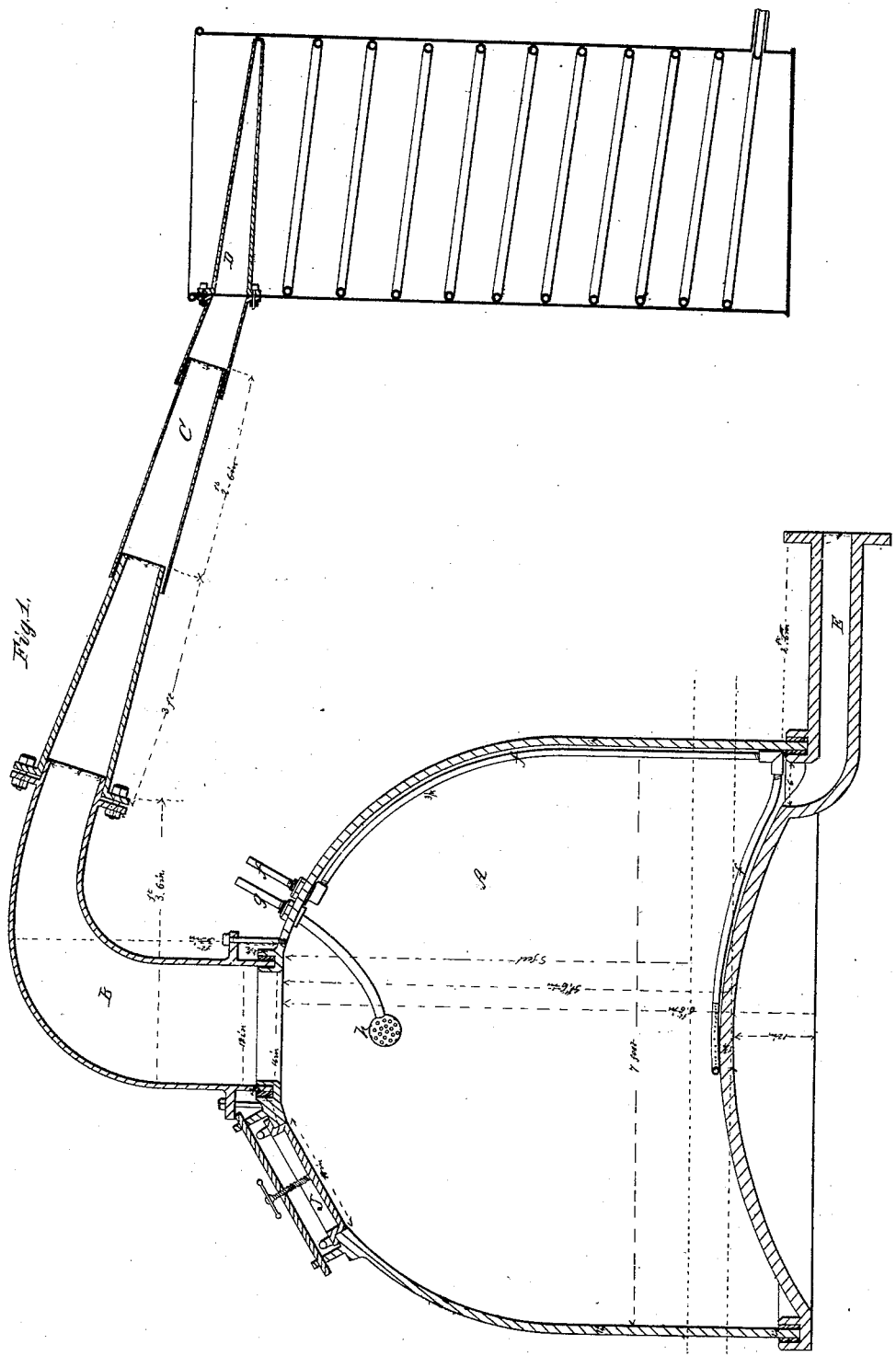

2 Sheets—Sheet 2.
L. S. ROBBINS.
APPARATUS FOR MANUFACTURING PAINT OIL.
No. 8,491. Patented Nov. 4, 1851.
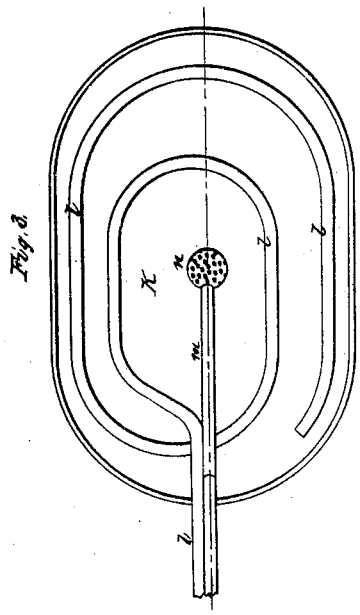
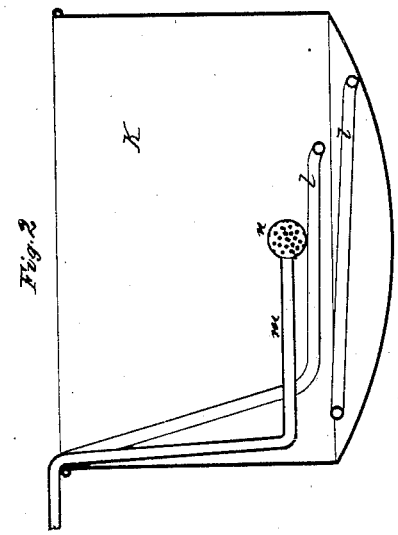

UNITED STATES PATENT OFFICE.

L. S. ROBBINS, OF NEW YORK, N. Y.

IMPROVEMENT IN PAINT-OIL FROM ROSIN.

Specification forming part of Letters Patent No. 8,491, dated November 4, 1851.

*To all whom it may concern:*

Be it known that I, LOUIS S. ROBBINS, of the city, county, and State of New York, have invented or produced a new product or manufacture, which I denominate "Robbins' Paint-Oil;" and I do hereby declare that the following is a full and exact description of the method or process by which I produce the said oil, reference being had to the accompanying drawings, making a part of this specification.

Figure 1 is a vertical section of a distilling apparatus; Fig. 2, a vertical section of a bleaching and purifying kettle, and Fig. 3 a top view of the said kettle.

A is the body of the still, which I shall hereinafter designate by the word "still;" B, a curved pipe connected with the top of the still; C, a movable joint of pipe for connecting the curved still-neck B with the still worm or condenser D; $f$, a steam-pipe passing through the side of the still, and thence down its inner side and along its bottom, to near the center thereof, where it is curved into a circular or spiral form around the center of the still-bottom, and is perforated with holes for the injection of steam into the still, to be used as an auxiliary in the process of producing my new paint-oil. $g$ is a steam-pipe passing through a close joint in the side of the still, and terminating in a spherical perforated head, (or coil,) $h$, in the upper portion of the still.

A thermometer must be combined with the still in such a manner as to indicate the temperature of the interior thereof. I make use of Fahrenheit's thermometer, and consequently all allusions to temperature in this specification have reference to that instrument.

K is the bleaching and purifying kettle. $l$ is a steam-pipe, combined therewith in such a manner as to enable the temperature of the oil to be raised when placed in the said kettle, and $m$ is a steam-pipe terminating in a perforated head (or coil) near the center of the bottom of the kettle, through which steam is injected into the oil, for the purpose hereinafter set forth.

The following is a description of the process by which I produce my new paint-oil, to wit: Place in the still a quantity of oil which has been distilled from rosin at a temperature of 650°, as described in the patent issued to me, and bearing the same date with the present patent, and then close the man-hole plate and lute it in the usual manner. When thus prepared, make a fire under the still, and so regulate it as to gradually raise the temperature of the interior thereof to about 650°, and retain it as near to that range of temperature as possible until the process is completed. When the temperature of the interior of the still reaches to about 300° of heat, inject steam into the oil contained therein through the pipe $f$, and when its temperature reaches 650° inject steam into the still through the pipe $g$. Oil will commence passing off from the still in the form of vapor as soon as the interior temperature reaches 650° of heat, and about this range of temperature must be maintained within the still until all the oil contained therein has been volatilized. The volatilized oil, mixed with the steam injected into the top and bottom of the still, will pass into and be condensed in the worm D, and thence flow into a suitable receiving-vessel. The steam injected into the bottom of the still aids in volatilizing the oil, and the steam injected into the top of the still serves the purpose of purifying and partially bleaching the oil when in a volatilized state. The oil produced by the aforesaid process of distillation must be again distilled in precisely the same manner as that before described. The oil produced by this last process of distillation must now be placed in the open purifying-kettle K, and after raising its temperature to about the range of 225° by means of the steam-pipe $l$, steam must be injected into the oil through the steam-pipe $m$ until the oil is fixed, and until the acid and coloring-matter produced therein by the action of the atmosphere is expelled therefrom, when it will be quite limpid and in a proper condition for being subjected to a process of boiling similar to that which linseed-oil is passed through to fit it for use.

What I claim as my invention, and desire to secure by Letters Patent, is—

1. The new and original product or manufacture, which I denominate "Robbins' Paint-Oil," the process of producing which I have herein fully set forth.

2. Every use and application of my said oil.

LOUIS S. ROBBINS.

Witnesses:
Z. C. ROBBINS,
J. S. BROWN.